(12) United States Patent
Caruel et al.

(10) Patent No.: US 11,965,474 B2
(45) Date of Patent: Apr. 23, 2024

(54) SYSTEM FOR CONTROLLING A THRUST REVERSER FOR A NACELLE

(71) Applicant: Safran Nacelles, Gonfreville l'Orcher (FR)

(72) Inventors: Pierre Caruel, Moissy Cramayel (FR); Régis Giard, Moissy Cramayel (FR); Alexandre Descamps, Moissy Cramayel (FR); Philippe Vancon, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 492 days.

(21) Appl. No.: 17/402,961

(22) Filed: Aug. 16, 2021

(65) Prior Publication Data

US 2022/0010752 A1 Jan. 13, 2022

Related U.S. Application Data (63) Continuation of application No. PCT/FR2020/050233, filed on Feb. 10, 2020.

(30) Foreign Application Priority Data

Feb. 14, 2019 (FR) .................................... 19/01503

(51) Int. Cl.
 *F02K 1/76* (2006.01)
(52) U.S. Cl.
 CPC .............. *F02K 1/763* (2013.01); *F02K 1/766* (2013.01)
(58) Field of Classification Search
 CPC ................................. F02K 1/763; F02K 1/766
 See application file for complete search history.

(56) References Cited

U.S. PATENT DOCUMENTS

| 3,086,360 A | | 4/1963 | Gavin | |
|---|---|---|---|---|
| 4,297,844 A | * | 11/1981 | Halin | .................. F02K 1/76 60/464 |
| 4,391,409 A | * | 7/1983 | Scholz | .................. F02K 1/763 239/265.29 |

(Continued)

FOREIGN PATENT DOCUMENTS

FR 2435604 4/1980

OTHER PUBLICATIONS

International Search Report for International Application PCT/FR2020/050233, dated May 27, 2020.

*Primary Examiner* — Lorne E Meade
(74) *Attorney, Agent, or Firm* — Burris Law, PLLC (57) ABSTRACT

A control system includes an actuator, a locking/unlock device, a central control valve, first and second control valves, and a spool control valve. The actuator is arranged so as to move a door of a thrust reverser between direct jet and reverse jet positions. The locking/unlocking device unlockable under load allowing locking and/or unlocking of the door. The locking/unlocking device is movable between a closure position in which it holds the door in the direct jet position and an opening position in which the door is released. The first and second control valves each fed by the central control valve. The spool control valve fed at least by the first and second control valves. The spool control valve is configured so that a pressure difference between two inlets of the first and second control valves provides a displacement of the spool control valve between first and second stable positions.

9 Claims, 4 Drawing Sheets

(56) References Cited

U.S. PATENT DOCUMENTS

| | | | | |
|---|---|---|---|---|
| 8,601,789 B2* | 12/2013 | Le Coq | ................ | F15B 15/26 60/226.1 |
| 10,054,079 B2* | 8/2018 | Kopecek | ................ | F02K 1/605 |
| 10,288,007 B2* | 5/2019 | Kopecek | ................ | F02K 1/58 |
| 10,626,824 B2* | 4/2020 | Kopecek | ................ | F02K 1/62 |
| 2017/0226963 A1 | 8/2017 | Kopecek et al. | | |

\* cited by examiner

SYSTEM FOR CONTROLLING A THRUST REVERSER FOR A NACELLE

CROSS-REFERENCE TO RELATED APPLICATIONS

This application is a continuation of International Application No. PCT/FR2020/050233, filed on Feb. 10, 2020, which claims priority to and the benefit of FR 19/01503 filed on Feb. 14, 2019. The disclosures of the above applications are incorporated herein by reference.

FIELD

The present disclosure relates to a system for controlling a thrust reverser for a nacelle.

BACKGROUND

The statements in this section merely provide background information related to the present disclosure and may not constitute prior art.

An aircraft is propelled by one or several propulsion unit(s) including a turbojet engine housed within a tubular nacelle. Each propulsion unit is attached to the aircraft via a mast generally located under a wing or at the level of the fuselage.

In general, a nacelle has a structure including an air inlet upstream of the engine, a middle section intended to surround a fan of the turbojet engine and a downstream section accommodating thrust reversal device.

The thrust reverser is a device that allows the air flow generated by the turbojet engine to be directed forwards, thereby allowing shortening of the landing distance and also limiting the load on the brakes at the level of the landing gears.

Most modern technologies use bypass turbojet engines. In these bypass turbojet engines, a hot air flow, called primary flow, is generated by a turbomachine, and a cold air flow, called secondary flow, is generated by the blades of the fan. This second flow, called cold air flow, circulates outside the turbojet engine through an annular passage, also called the secondary flow path. This secondary flow path is formed between a fairing of the turbojet engine and the inner wall of the nacelle. Afterwards, the primary and secondary flows are mixed downstream of the secondary flow path.

In this engine type, the thrust reverser totally or partially seals the mixed air flow path by means of flaps in order to redirect this flow forward of the nacelle.

There are several different technologies known to those skilled in the art to make these thrust reversers in particular with sliding or pivoting doors whose actuation is electric or hydraulic.

In any case, the thrust reversal device includes at least one door or cowl, movable between a direct jet position, in which the door provides the aerodynamic continuity of the nacelle and a reverse jet position in which the door opens a passage in the nacelle by opening cascade vanes disposed around this flow path which receive the mixed air flow diverted by the flaps to return it back outwards and forwards.

Moreover, it is also known to lock these doors by a locking/unlocking device such as hooks engaging, in the closure position, with an element of the movable cowl.

In order to allow locking with no load being exerted on the locking/unlocking device, it is common to provide for an over-stowing of the movable portion. This is applied in particular to thrust reversers with pivoting doors.

In the case of a hydraulic mechanism for locking and unlocking the doors of the thrust reverser, this over-stowing is implemented upon opening of the doors for example, through a step of pressurizing the cylinder type actuators, which by default holds the actuators in the closed position, before control of the locks which then determine opening of the door and then of the actuator(s), the operation being sequential. It is the first step of pressurizing the actuators which displaces the door over this over-stroke, thereby reducing, and possibly suppressing, the load to which the locks are subjected before opening thereof is controlled. Nonetheless, even with the use of locks unlockable under load, the architecture of control systems known to those skilled in the art leads to carrying out an undesirable closure cycle, and consequently results in sizing the structure and the control system while providing for fatigue.

SUMMARY

This section provides a general summary of the disclosure and is not a comprehensive disclosure of its full scope or all of its features.

The present disclosure provides a hydraulic architecture for controlling a thrust reverser without an over-stowage associated with at least one lock unlockable under load, and whose fatigue is reduced.

The present disclosure provides a system for controlling a thrust reverser for a nacelle of a propulsion unit that includes an engine and accommodating movable thrust reversal device. The movable thrust reversal device includes at least one door movable between a direct jet position, in which the door provides the aerodynamic continuity of the nacelle and a reverse jet position in which it opens at least one passage in the nacelle receiving an air flow diverted by the thrust reversal device to return it back outwards and forwards. The control system includes at least one maneuvering actuator arranged so as to maneuver the door between the direct jet and reverse jet positions, at least one locking/unlocking device unlockable under load allowing locking and/or unlocking of the door. The locking/unlocking device is movable between a closure position in which it holds the doors in the direct jet position and an opening position in which the doors are released. The control system further includes a central control valve forming an isolation control unit, first and second control valves each fed by the central control valve, and a spool control valve fed at least by the first and second control valves. The spool control valve is configured so that the pressure difference between the two inlets of the first and second control valves provides the displacement of the spool of the spool control valve between a first stable position and a second stable position. Each of the maneuvering actuator and the locking/unlocking device is configured to be controlled by at least one element selected among the first control valve, the second control valve and the spool control valve. Thanks to such a combination of features, the at least one maneuvering actuator and the at least one locking/unlocking device are controlled by three valves which are the central control valve, and the first and second control valves, for example solenoid valves.

In one form, upon opening of the maneuvering actuator, the actuation is not directly pressurized before an unlocking step and their operations are substantially parallel on the hydraulic plane.

In another form, thanks to the presence of such a spool, opening of the central control valve does not directly involve the pressurization of the maneuvering actuator.

In variations of the control system, which may be implemented individually or in any combination: the maneuvering actuator and the locking/unlocking device are controlled by double-acting cylinders with two chambers, each fed by at least one element selected among the first valve, the second valve and the spool control valve; the control system includes a primary lock controlled by the locking/unlocking device, the primary lock preferably consisting of a single-acting cylinder; the first valve is fed by the central control valve at the input and feeds at the output the spool control valve, the maneuvering actuator and the locking/unlocking device; the second valve is fed by the central control valve at the input and feeds at the output the spool control valve, and a tertiary lock; the primary lock is unlockable under load; the spool control valve is configured to reach one among the first stable position and the second stable position when it is fed by an identical pressure coming from both the first control valve and the second control valve; a return device acts on the spool control valve so that it adopts a default position among the first stable position and the second stable position when the spool control valve is fed by an identical pressure coming from both the first control valve and the second control valve; and the maneuvering actuator is configured to be controlled, at least in closure, by the spool control valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
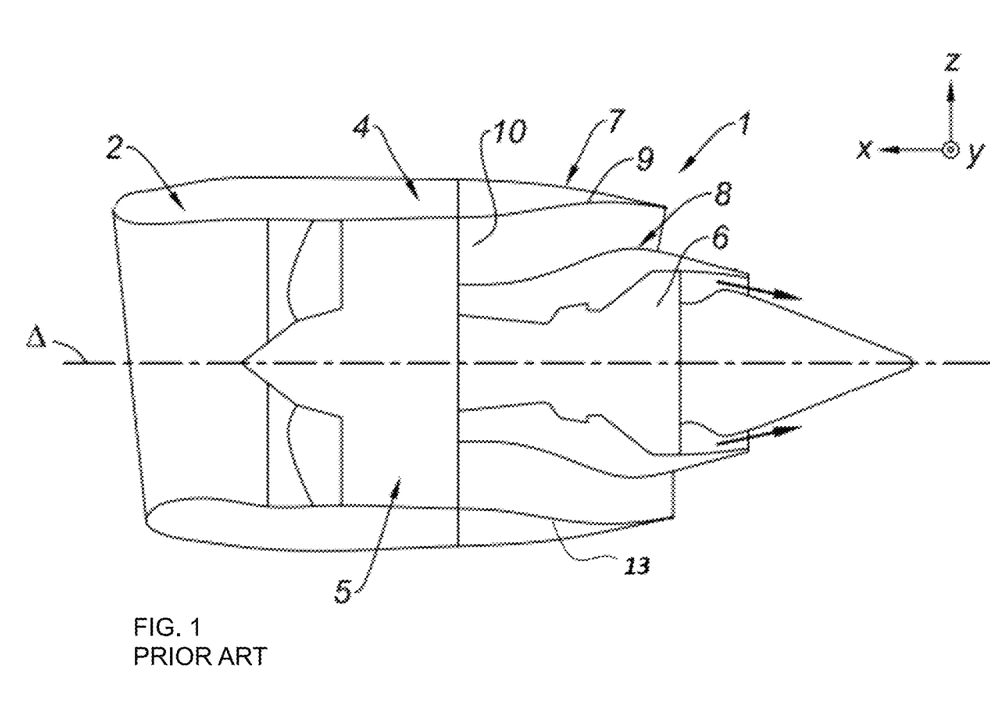
FIG. 1 is a partial cross-sectional view of a nacelle of the prior art.

As provided in FIG. 1, a nacelle 1 of the prior art has a substantially tubular shape according to a longitudinal axis A (the longitudinal axis A is parallel to X).

Conventionally, the nacelle 1 includes an upstream section 2, a middle section 4 surrounding a fan 5 of an engine 6 such as a bypass turbojet engine and a downstream section 7 accommodating a thrust reverser system (not shown). The nacelle is configured to channel the air flows generated by the engine 6.

Figure 2:
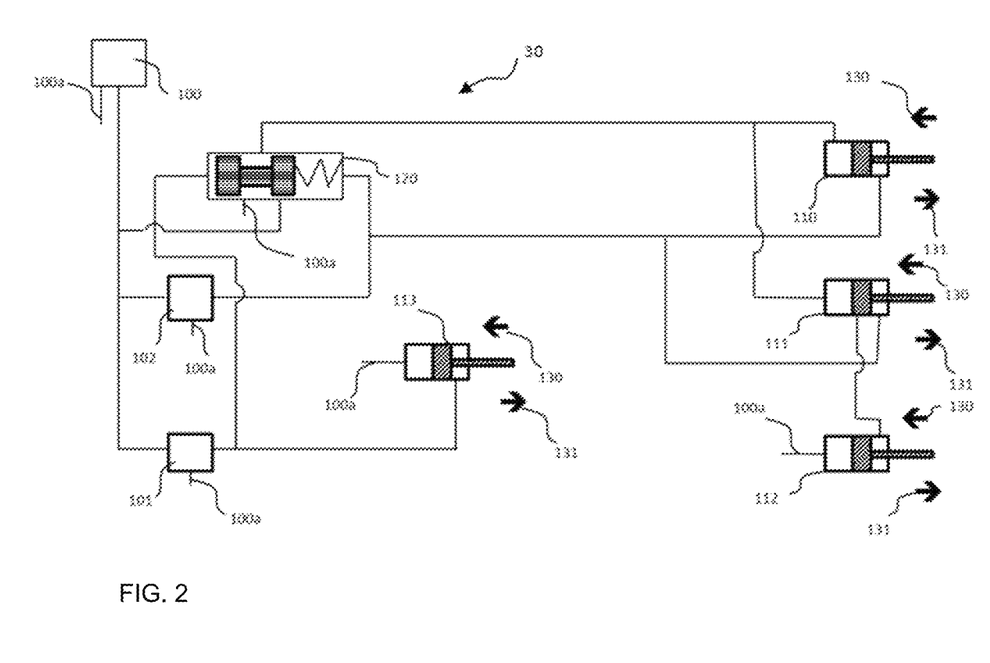
FIG. 2 is a schematic view of a system for controlling a thrust reverser according to a first form of the present disclosure.
Figure 3:
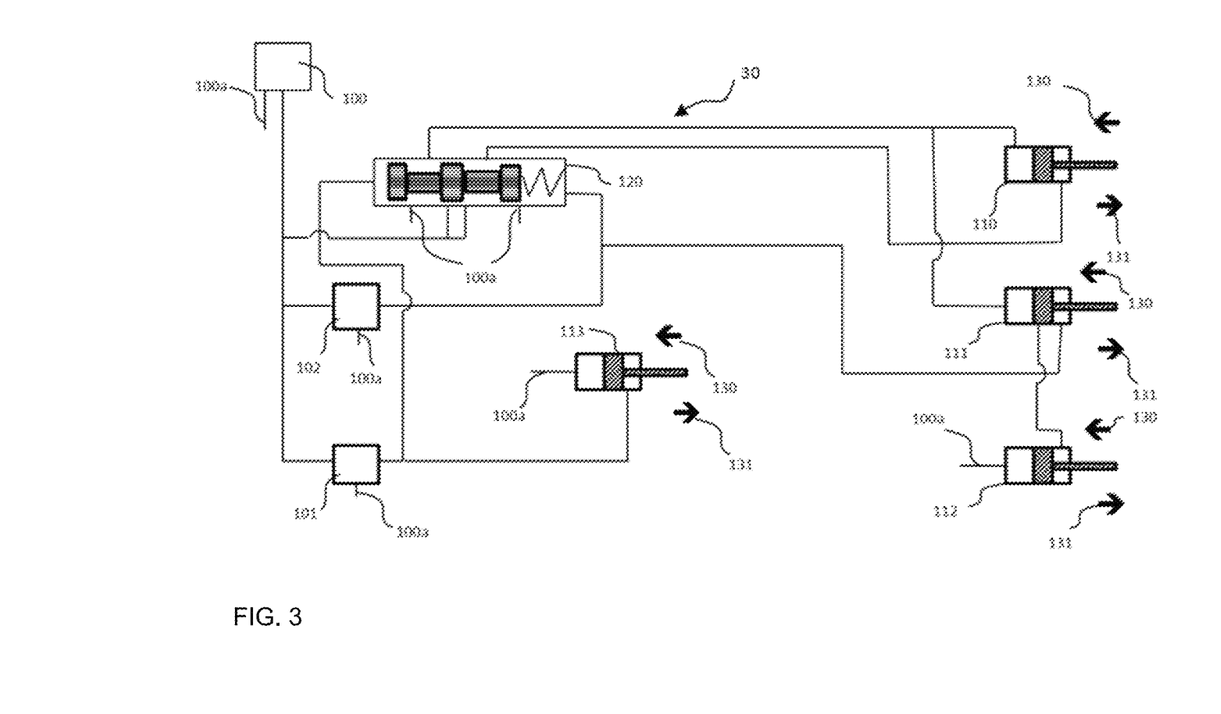
FIG. 3 a schematic view of a system for controlling a thrust reverser according to a second form of the present disclosure.
Figure 4:
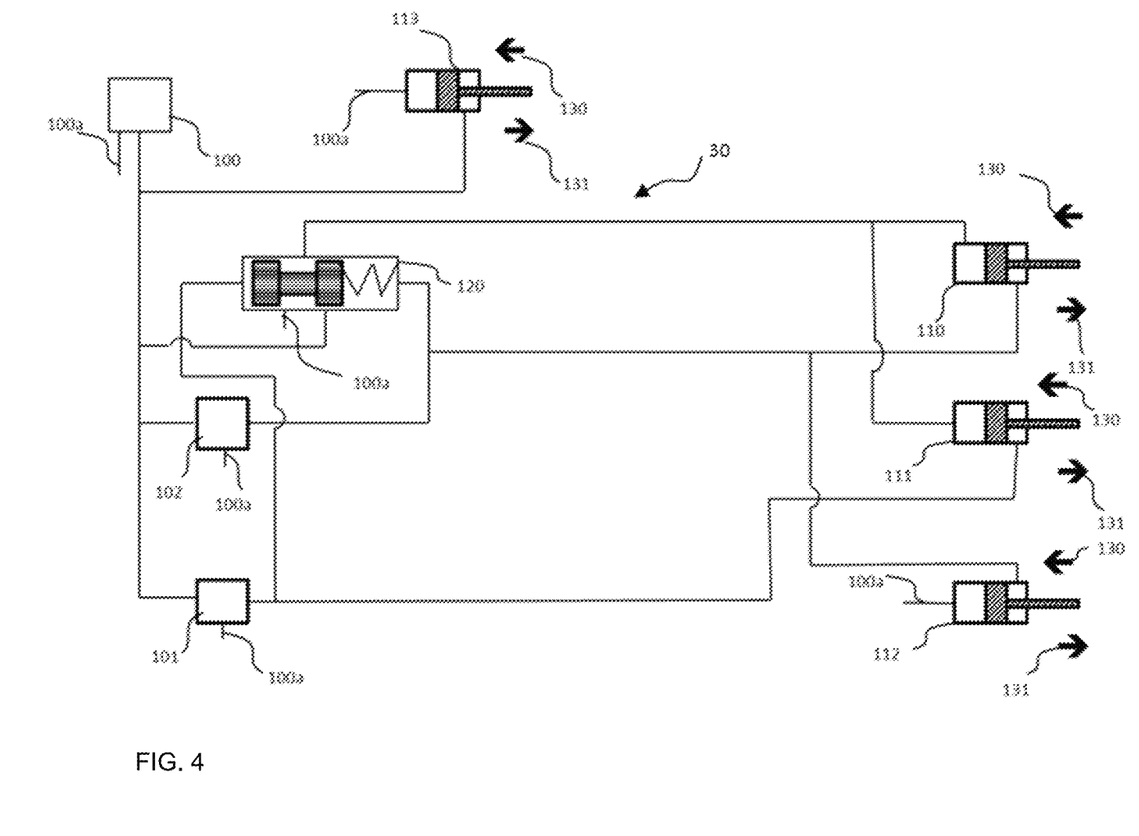
FIG. 4 a schematic view of a system for controlling a thrust reverser according to a third form of the present disclosure.

In turn, the downstream section 7 includes an inner structure 8 surrounding the upstream portion of the turbojet engine 6, an outer structure 9 forming a mixed flow channel 10, and an outer cowl 13 including a movable thrust reversal device or means (not shown). The movable thrust reversal device includes at least one movable door (not shown). As shown in FIGS. 2, 3 and 4, in order to control doors of the outer cowl 13 to achieve thrust reversal, the control system 30 uses a hydraulic or pneumatic or electromechanical pressure device. It includes at least one maneuvering actuator 110 arranged so as to maneuver or move the door(s) between the direct jet position in which the door provides the aerodynamic continuity of the nacelle and the reverse jet position in which it opens at least one passage in the nacelle receiving an air flow diverted by the thrust reversal device to return it back outwards and forwards. For example, the maneuvering actuator 110 is composed by one or several hydraulic cylinder(s). For example, the maneuvering actuator 110 is fastened directly or indirectly on at least one of the doors so that when it is in a closure position 131, the door is maneuvered into the direct jet position. In the opening position 130, the maneuvering actuator 110 drives the door towards a reverse jet position. The maneuvering actuator 110 is connected and controlled, for example hydraulically, by at least one of the elements selected among the first valve 102, the second valve 101 and the spool control valve 120 described hereinafter.

The control system 30 also includes at least one locking/unlocking device or means 111 allowing locking and/or unlocking of the door. Furthermore, the locking/unlocking device 111 is movable between a closure position 131 in which it holds the doors in the direct jet position and an opening position 130 in which the doors are released. For example, the locking/unlocking device 111 may include a hydraulic or pneumatic or magnetic or electric cylinder coupled to hooks (not shown) adapted to be hinged and blocked around elements secured to the doors. Those skilled in the art could also arrange a locking/unlocking device 111 so it could be movable between a closure position 131 in which it holds the doors in the direct jet position and an opening position 130 in which the doors are released. The locking/unlocking device 111 is connected and controlled, for example hydraulically, by at least one of the elements selected among the first valve 102, the second valve 101 and the spool control valve 120 described hereinafter. In all forms, the locking/unlocking device 111 must be unlockable under load.

The control system 30 also includes a central control valve 100 which forms an isolation control unit. Advantageously, this valve allows isolating the system in terms of pressurization. For example, it consists of a spool solenoid valve (not shown), with a pressure sensor (not shown) to allow monitoring of the state thereof.

The control system 30 also includes a first control valve or first valve 102 consisting for example of a 3-way solenoid valve. The control system 30 also includes a second control valve or second valve 101 consisting of a 3-way solenoid valve. Each is fed by the central control valve 100 via a hydraulic circuit. The first control valve 102 and the second control valve 101 are monitored, for example in an electro-magnetic way, in order to allow selective setting of the hydraulic circuit to which they are connected at the service pressure or at the return pressure.

The control system 30 further includes a spool control valve 120 having first and second stable positions. For example, the spool control valve 120 is hydraulically fed at least by the first and second control valves 102, 101. The spool control valve 120 is configured so that the pressure difference between the two inlets of the first and second control valves 102, 101 provides the displacement of the spool of the spool control valve 120 between the two stable positions, for example thereby opening or closing the spool control valve 120. Advantageously, the spool of the spool control valve 120 is in the closure position if the second control valve 101 is active and if the first control valve 102 is inactive. When the pressures originating from the first and second control valves 102, 101 are identical, then one among the first or second positions is adopted by the spool control valve 120. In one form, the spool control valve 120 is by default in the opening position if the pressures derived from the first and second control valves 102, 101 are identical. For example, the default opening position of the spool control valve 120 may also be obtained by a return device such as a spring. Thus, the return device acts on the spool control valve so that it adopts a default position selected among the first stable position and the second stable position when the spool control valve 120 is fed by an identical pressure originating from both the first control valve 102 and the second control valve 101. The first or the second position of the spool control valve 120 may also be obtained using the return device. Thus, thanks to this architecture, upon pressurization of the system upon opening of the central control valve 100, there is no closing force, in other words no over-stowing exerted for example on the cylinders composing the maneuvering actuator 110 or composing the locking/unlocking device 111.

In one example, the maneuvering actuator 110 and the locking/unlocking device 111 are controlled by double-acting cylinders with two chambers, each fed by at least one element selected among the first control valve 102, the second control valve 101 and the spool control valve 120.

In all forms, the spool control valve 120 is fed by the central control valve 100 and controlled by the pressure difference, at its terminals, between the supply originating from the circuit passing through the first control valve 102 and the second control valve 101.

In a first form, illustrated in FIG. 2, the control system 30 includes a controlled primary lock 112, in particular to reach an opening position 130, by the locking/unlocking device 111 once the latter has reached the full opening unlocked position 130. Advantageously, this provides that the locking/unlocking device 111 is in its opening position 130 when the primary lock 112 is released and the deployment of the doors starts which avoids having excessive forces on the structure. For example, the primary lock 112 can include a single-acting cylinder. In another example, the primary lock 112 includes a hook-like shaped portion. In the first form, the second valve 101 is fed by the central control valve 100 at the input and it feeds at the output the spool control valve 120 to control it and a tertiary lock 113. In one example, the tertiary lock includes a cylinder, in particular a single-acting cylinder. The primary lock 112 and the locking/unlocking device 111 are unlockable under load. The tertiary lock 113 and the primary lock 112 allow for an additional safety in the event of a malfunction for example of the locking/unlocking device 111. The first control valve 102 is fed by the central control valve 100 at the input. Afterwards, the first control valve 102 feeds at the output the spool control valve 120, which, in this form, consists of a simple spool control valve, the maneuvering actuator 110 and the locking/unlocking device 111. The maneuvering actuator 110 is fed by the second control valve 102 to reach the opening position 130 and by the spool control valve 120 to reach the closure position 131. The overall circuit, for example hydraulic, is closed via hydraulic returns 100a. Advantageously, this allows reducing the risk of incident should a malfunction occur. The steps of implementing the opening (steps A to D) and the closure (step E) of the doors of the thrust reverser, from the elements of the previously-described control system 30, are set out in Table 1.

TABLE 1

|  |  | 101 | 102 | 100 | 110 | 111 | 112 | 113 |
|---|---|---|---|---|---|---|---|---|
| Opening doors | A | Closed | Closed | Open | No action | No action | No action | No action |
|  | B | Open | Open | Open | 130 | 130 (partial) | No action | 130 |
|  | C | Open | Open | Open | 130 | 130 | 130 | 130 |
|  | D | Closed | Open | Open | 130 | 130 | 130 | 130 |
| Closing doors | E | Open | Closed | Open | 131 | 131 | 131 | 130 |

In a second form, illustrated in FIG. 3, the control system 30 includes a controlled primary lock 112, in particular to reach its opening configuration 130, by the locking/unlocking device 111 once the latter has reached the full unlocked position 130. Advantageously, this provides that the locking/unlocking device 111 is in its opening position 130 when the primary lock 112 is released and that the deployment of the doors starts, which avoids having excessive forces on the structure. For example, the primary lock 112 includes a single-acting cylinder. In one example, the primary lock 112 includes a hook-like shaped portion. The primary lock 112 and the locking/unlocking device 111 must be unlockable under load. In this second form, the second valve 101 is fed by the central control valve 100 at the input and it feeds at the output the spool control valve 120 to control it and a tertiary lock 113. In one example, the tertiary lock 113 includes for example a cylinder, in particular a single-acting cylinder. In particular, the tertiary lock 113 and the primary lock 112 allow for an additional safety in the event of a malfunction for example of the locking/unlocking device 111. The first control valve 102 is fed by the central control valve 100 at the input. Afterwards, the first control valve 102 feeds at the output the spool control valve 120 and the locking/unlocking device 111. In this form, the spool control valve 120 is of the dual type which allows it to control the maneuvering actuator 110 in either direction according to the position of the spool of said spool control valve 120. The second control valve 101 is fed by the central control valve 100 at the input. The locking/unlocking device 111 is configured to be fed by the second control valve 102 in order to reach its opening position 130 and fed by the spool control valve 120 in order to reach its closure position 131. The spool control valve 120 feeds, in a first intermediate configuration piloted by the first and second control valves 102, 101, the actuator 110 towards its closure position 131 and in a second intermediate configuration also piloted by the first and second control valves 102, 101, the spool control valve 120 feeds the actuator in its opening position 130. In this form, the actuator 110 is therefore completely piloted by the spool control valve 120 which avoids being affected by the flow rate limit of the first control valve 102. The overall circuit, for example hydraulic, is closed by hydraulic returns 100a. A table describing the steps of implementing the opening (steps A to D) and the closure (step E) of the doors of the thrust reverser, from the elements of the previously-described control system 30, is set out in Table 2.

TABLE 2

|  |  | 101 | 102 | 100 | 110 | 111 | 112 | 113 |
|---|---|---|---|---|---|---|---|---|
| Opening doors | A | Closed | Closed | Open | 130 | No action | No action | No action |
|  | B | Open | Open | Open | 130 | 130 (partial) | No action | 130 |
|  | C | Open | Open | Open | 130 | 130 | 130 | 130 |
|  | D | Closed | Open | Open | 130 | 130 | 130 | 131 |
| Closing doors | E | Open | Closed | Open | 131 | 131 | 131 | 130 |

In a third form, illustrated in FIG. 4, the control system 30 includes a primary lock 112 controlled by the first control valve 102. For example, the primary lock 112 includes a single-acting cylinder. In one example, the primary lock 112 includes a hook-like shaped portion. In this third form, the second valve 101 is fed by the central control valve 100 at the input and it feeds at the output the spool control valve 120 to control it and the locking/unlocking device 111. In this form, the spool control valve 120 is of the dual type which allows it to control the maneuvering actuator 110 in either direction according to the position of the spool of said spool control valve 120. An optional tertiary lock 113 is fed at the input by the central control valve 100. In one example, the tertiary lock includes for example a cylinder, in particular a single-acting cylinder. In another preferred example, the primary lock 112 is unlockable under load. In any case, the locking/unlocking device 111 must be unlockable under load. The tertiary lock 113 and the primary lock 112 allow for an additional safety in the event of a malfunction for example of locking/unlocking device 111. The first control valve 102 is fed by the central control valve 100 at the input. Afterwards, the first control valve 102 feeds at the output the spool control valve 120 to control it, the maneuvering actuator 110 and the primary lock 112. The overall circuit, for example hydraulic, is closed by hydraulic returns 100a. Advantageously, this architecture allows eliminating a possible common mode between the primary lock 112 and the locking/unlocking device 111. A table describing the steps of implementing the opening (steps A to D) and the closure (step E) of the doors of the thrust reverser, from the elements of the previously-described control system 30, is set out in Table 3.

TABLE 3

|  |  | 101 | 102 | 100 | 110 | 111 | 112 | 113 |
|---|---|---|---|---|---|---|---|---|
| Opening doors | A | Closed | Closed | Open | No action | No action | No action | 130 |
|  | B | Closed | Open | Open | 130 | No action | 130 | 130 |
|  | C | Open | Open | Open | 130 | 130 | 130 | 130 |
|  | D | Closed | Open | Open | 130 | No action | 130 | 130 |
| Closing doors | E | Open | Closed | Open | 131 | 131 | 131 | 130 |

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system of a thrust reverser for a nacelle of a propulsion unit including an engine and accommodating movable thrust reversers, the movable thrust reversers including at least one door movable between a direct jet position in which the at least one door provides aerodynamic continuity of the nacelle and a reverse jet position in which the at least one door opens at least one passage in the nacelle so that the nacelle receives an air flow diverted by the movable thrust reversers to return the air flow outwards and forwards, the control system comprising:

at least one maneuvering actuator arranged so as to move the at least one door between the direct jet and reverse jet positions;

at least one locking/unlocking device unlockable under load allowing locking and/or unlocking of the at least one door, the at least one locking/unlocking device being movable between a closure position in which the at least one locking/unlocking device holds the at least one door in the direct jet position and an opening position in which the at least one door is released;
a central control valve forming an isolation control unit;
first and second control valves each fed by the central control valve; and
a spool control valve fed at least by the first and second control valves, the spool control valve being configured so that a pressure difference between two inlets of the first and second control valves provides a displacement of the spool control valve between a first stable position and a second stable position,
wherein each of the at least one maneuvering actuator and the at least one locking/unlocking device is configured to be controlled by at least one of the first control valve, the second control valve and the spool control valve.

2. The control system according to claim 1, wherein the at least one maneuvering actuator and the at least one locking/unlocking device are controlled by double-acting cylinders with two chambers each fed by at least one of the first control valve, the second control valve and the spool control valve.

3. The control system according to claim 1, further comprising a primary lock controlled by the at least one locking/unlocking device, the primary lock includes a single-acting cylinder.

4. The control system according to claim 3, wherein the primary lock is unlockable under load.

5. The control system according to claim 1, wherein an input of the first control valve is fed by the central control valve, and wherein an output of the first control valve feeds the spool control valve, the at least one maneuvering actuator and the at least one locking/unlocking device.

6. The control system according to claim 1, wherein an input of the second control valve is fed by the central control valve, and wherein an output of the second control valve feeds the spool control valve and a tertiary lock.

7. The control system according to claim 1, wherein the at least one maneuvering actuator is controlled by the spool control valve.

8. The control system according to claim 1, wherein the spool control valve is configured to reach one of the first stable position and the second stable position when it is fed by an identical pressure coming from both the first control valve and the second control valve.

9. The control system according to claim 1, wherein a return device acts on the spool control valve so that the spool control valve adopts a default position among the first stable position and the second stable position when the spool control valve is fed by an identical pressure coming from both the first control valve and the second control valve.

* * * * *